(12) United States Patent
Sherry

(10) Patent No.: US 8,747,162 B2
(45) Date of Patent: Jun. 10, 2014

(54) HOST DEVICE WITH MEMORY CARD SLOT HAVING A CARD GRIPPING-EXTRACTING RECESS

(75) Inventor: Leah Sherry, Milpitas, CA (US)

(73) Assignee: SanDisk Technologies Inc., Plano, TX (US)

( * ) Notice: Subject to any disclaimer, the term of this patent is extended or adjusted under 35 U.S.C. 154(b) by 105 days.

(21) Appl. No.: 13/434,455

(22) Filed: Mar. 29, 2012

(65) Prior Publication Data
US 2013/0260612 A1    Oct. 3, 2013

(51) Int. Cl.
*H01R 24/00*    (2011.01)

(52) U.S. Cl.
USPC .......................................... 439/630; 439/638

(58) Field of Classification Search
USPC .......... 439/629, 630, 635, 637, 638, 945, 946
See application file for complete search history.

(56) References Cited

U.S. PATENT DOCUMENTS

| | | |
|---|---|---|
| D290,119 S | 6/1987 | Trezise et al. |
| D292,399 S | 10/1987 | Yukawa |
| D294,020 S | 2/1988 | Yukawa |
| D315,902 S | 4/1991 | Nakamura |
| D315,903 S | 4/1991 | Nakamura |
| D318,273 S | 7/1991 | Takaichi |
| D337,568 S | 7/1993 | Ellis |
| D350,951 S | 9/1994 | Tseng |
| D365,556 S | 12/1995 | Inoue et al. |
| D382,868 S | 8/1997 | Ashida |
| D410,916 S | 6/1999 | Oba |
| 5,918,163 A | 6/1999 | Rossi |
| D414,481 S | 9/1999 | Wu |
| D417,212 S | 11/1999 | Oba |
| D421,856 S | 3/2000 | Kirihara et al. |
| D422,981 S | 4/2000 | Sumner et al. |
| 6,097,605 A | 8/2000 | Klatt et al. |
| D434,042 S | 11/2000 | Yasufuku et al. |
| D444,789 S | 7/2001 | Obata |
| D451,501 S | 12/2001 | Sward et al. |

(Continued)

FOREIGN PATENT DOCUMENTS

| | | |
|---|---|---|
| EP | 1 118 958 | 7/2001 |
| EP | 1 326 194 | 7/2003 |
| EP | 1 574 989 | 9/2005 |

OTHER PUBLICATIONS

"The Nifty MiniDrive-Indiegogo", http://www.indiegogo.com/The-Nifty-MiniDrive-More-Space-Pretty-Package?c=home, printed on Jan. 3, 2013, 9 pages.

(Continued)

*Primary Examiner* — Thanh Tam Le
(74) *Attorney, Agent, or Firm* — Brinks Gilson & Lione

(57) ABSTRACT

A host device with a memory card slot and an associated fingernail recess is provided. In one embodiment, a host device is provided comprising a housing with an outer surface, a memory card slot formed in the housing and accessible for memory card insertion through a slot opening in the outer surface, and a plurality of electrical contacts exposed in the memory card slot for engaging corresponding contacts on a memory card. The host device further comprises a recess in the outer surface associated with the slot opening, wherein the recess is sized to allow fingernail access to a fingernail grip of the memory card in the memory card slot. Other embodiments are possible, and each of the embodiments can be used alone or together in combination.

6 Claims, 18 Drawing Sheets

(56) References Cited

U.S. PATENT DOCUMENTS

| | | |
|---|---|---|
| 6,333,854 B1 | 12/2001 | Sasaoka et al. |
| 6,381,143 B1 | 4/2002 | Nakamura |
| D460,453 S | 7/2002 | Homma et al. |
| D466,119 S | 11/2002 | Funahashi et al. |
| D467,586 S | 12/2002 | Shimoda et al. |
| 6,545,643 B1 | 4/2003 | Sward et al. |
| 6,567,273 B1 | 5/2003 | Liu et al. |
| 6,655,972 B2 | 12/2003 | Sato |
| D487,747 S | 3/2004 | Yu et al. |
| 6,729,892 B2 | 5/2004 | Takada et al. |
| D492,686 S | 7/2004 | Yu et al. |
| 6,816,386 B2 | 11/2004 | Oguchi et al. |
| 6,834,810 B2 | 12/2004 | Maruyama |
| D504,433 S | 4/2005 | Nishizawa et al. |
| D510,935 S | 10/2005 | Yamada et al. |
| 6,979,227 B2 | 12/2005 | Ikeda |
| D515,587 S | 2/2006 | Cuellar et al. |
| D517,072 S | 3/2006 | Yamada et al. |
| 7,032,827 B2 | 4/2006 | Wang et al. |
| D523,860 S | 6/2006 | Xu et al. |
| 7,059,871 B1 | 6/2006 | Hsiao |
| 7,094,106 B2 | 8/2006 | Yamamoto et al. |
| 7,097,510 B1 * | 8/2006 | Chen ............................ 439/630 |
| D529,031 S | 9/2006 | Huang et al. |
| D530,331 S | 10/2006 | Yao |
| 7,152,801 B2 | 12/2006 | Cuellar et al. |
| D535,297 S | 1/2007 | Cuellar et al. |
| D536,382 S | 2/2007 | Sugino et al. |
| 7,179,129 B1 | 2/2007 | Hwang |
| 7,210,967 B1 * | 5/2007 | Lee ............................... 439/630 |
| D551,669 S | 9/2007 | Kadonaga |
| D556,202 S | 11/2007 | Kadonaga |
| D558,199 S | 12/2007 | Fiorentino |
| 7,320,622 B2 | 1/2008 | Ying et al. |
| 7,357,677 B2 * | 4/2008 | Liu ............................... 439/630 |
| 7,371,119 B1 * | 5/2008 | Lee ............................... 439/630 |
| 7,392,343 B2 | 6/2008 | Oshima |
| 7,410,376 B2 | 8/2008 | Ying et al. |
| 7,455,555 B1 * | 11/2008 | Lai ............................... 439/630 |
| D586,349 S | 2/2009 | Matsumoto et al. |
| D591,751 S | 5/2009 | Ku |
| D591,752 S | 5/2009 | Aoki |
| D591,754 S | 5/2009 | Hwangbo et al. |
| 7,530,852 B2 * | 5/2009 | Hu et al. ...................... 439/630 |
| D604,738 S | 11/2009 | Matsumoto et al. |
| 7,798,840 B2 | 9/2010 | Hubert et al. |
| 7,866,999 B2 * | 1/2011 | Matsunaga ................... 439/159 |
| 7,909,650 B2 * | 3/2011 | Matsunaga ................... 439/630 |
| 7,927,117 B2 * | 4/2011 | Yu et al. ....................... 439/159 |
| D641,050 S | 7/2011 | Matsui et al. |
| D643,432 S | 8/2011 | Nakamura |
| 8,060,131 B2 | 11/2011 | Shin et al. |
| 8,092,256 B2 * | 1/2012 | Takao ........................... 439/630 |
| 8,142,229 B1 * | 3/2012 | Bobuk et al. .................. 439/630 |
| D670,292 S | 11/2012 | Komatani et al. |
| 2001/0043160 A1 | 11/2001 | Hirai et al. |
| 2004/0037145 A1 | 2/2004 | Tagawa et al. |
| 2005/0021909 A1 | 1/2005 | Much et al. |
| 2005/0037671 A1 | 2/2005 | Yamada et al. |
| 2005/0247786 A1 | 11/2005 | Chen |
| 2005/0279838 A1 | 12/2005 | Wang et al. |
| 2006/0172603 A1 | 8/2006 | Matsumoto et al. |
| 2007/0126099 A1 | 6/2007 | Aoki et al. |
| 2007/0228536 A1 | 10/2007 | Aoki |
| 2011/0076867 A1 | 3/2011 | Achsaf et al. |
| 2011/0182037 A1 | 7/2011 | Katsumura |

OTHER PUBLICATIONS

"The Nifty MiniDrive-Indiegogo-Comments", http://www.indiegogo.com/The-Nifty-MiniDrive-More-Space-Pretty-Package?c=comments , printed on Jan. 3, 2013, 11 pages.

"The Nifty MiniDrive", http://www.facebook.com/TheNiftyMiniDrive, printed on Jan. 3, 2013, 10 pages.

"The Nifty MiniDrive by niftydrives-Kickstarter", http://www.kickstarter.com/projects/1342319572/the-nifty-minidrive, printed on Jan. 3, 2013, 9 pages.

Notice of Allowance for U.S. Appl. No. 29/417,076, dated Feb. 21, 2013, 12 pages.

"Any way to make SD card flush?," http://forums.macrumors.com/showthread.php?t=795066, 6 pages, Sep. 29, 2009.

"SD reader flush solution", http://forums.macrumors.com/showthread.php?t=1040837, 6 pages, Oct. 31, 2010.

"Secure Digital," http://en.wikipedia.org/wiki/Secure_digital, 25 pages, printed Mar. 6, 2012.

"Memory Card," U.S. Appl. No. 13/434,438, filed Mar. 29, 2012, inventors: Gadi Ben-Gad and Itzhak Pomerantz.

"Memory Card," U.S. Appl. No. 29/417,076, filed Mar. 29, 2012, inventors: Gadi Ben-Gad and Itzhak Pomerantz.

International Search Report and Written Opinion for PCT/US2013/023543 dated May 17, 2013, 12 pages.

\* cited by examiner

HOST DEVICE WITH MEMORY CARD SLOT HAVING A CARD GRIPPING-EXTRACTING RECESS

BACKGROUND

Memory cards, such as Secure Digital (SD) cards, are used with host devices, such as personal computers and other electronic devices, to store and/or retrieve data. Typically, the memory card fits into a slot in the host device or in a memory card reader attached to the host device. In some host devices, the slot is as long as the memory card, and a mechanism is used to lock-in and eject the memory card. For example, an SD card has a notch on one of its side surfaces, and a detent or other biasing mechanism in the host device can engage the notch when the SD card is completely inserted into the slot. In operation, a user pushes the memory card into the slot until the entirety of the memory card is inside the host device, at which point, the memory card "clicks" into a locking position. When the user removes pressure from the memory card, a spring mechanism inside the host device pushes the memory card slightly toward the user, so a small portion of the memory card is exposed from the host device. To eject the memory card from the host device, the user pushes the exposed portion of the memory card further into the slot, which causes the detent mechanism to disengage from the notch on the memory card and causes a spring inside the host device to eject the memory card from the slot.

Other host devices do not have a spring-loaded locking-and-ejection mechanism. For example, some host devices are designed to have a super-compact, ultra-slim form factor without sufficient room for the spring-loaded locking-and-ejection mechanism. As a result, the memory slot in such host devices is designed with a shorter depth, so when the memory card is fully inserted into the slot, a significant portion of the memory card is exposed from the host device. This allows the user to easily grasp the exposed portion of the memory card with his fingers and pull the memory card out of the slot. While an exposed memory card is suitable in many environments, an exposed memory card may not be aesthetically pleasing in some environments, especially with super-compact, ultra-slim form-factor host devices, where an exposed memory card may detract from the host device's sleek appearance and style. The exposed memory card may also prevent the host device from fitting into a form-fitting carrying case.

OVERVIEW

Embodiments of the present invention are defined by the claims, and nothing in this section should be taken as a limitation on those claims.

By way of introduction, the below embodiments relate to a host device with a memory card slot and an associated fingernail recess. In one embodiment, a host device is provided comprising a housing with an outer surface, a memory card slot formed in the housing and accessible for memory card insertion through a slot opening in the outer surface, and a plurality of electrical contacts exposed in the memory card slot for engaging corresponding contacts on a memory card. The host device further comprises a recess in the outer surface associated with the slot opening, wherein the recess is sized to allow fingernail access to a fingernail grip of the memory card in the memory card slot.

Other embodiments are possible, and each of the embodiments can be used alone or together in combination.

DETAILED DESCRIPTION OF THE PRESENTLY

Preferred Embodiments

Introduction

Handheld memory cards are removably connectible with host devices to store and/or retrieve data. In some environments, the memory card can fit into a slot in the host device or into a memory card reader attached to the host device. The host device can take any suitable form, such as, but not limited to, a personal computer (PC), a mobile phone, a digital media player, a game device, a personal digital assistant (PDA), a kiosk, a set-top box, a TV system, or a book reader. The memory card comprises a memory, a plurality of electrical contacts that mate with corresponding electrical contacts in the host device, and a controller interfacing between the memory and the plurality of electrical contacts. As used herein, the phrase "in communication with" could mean directly in communication with or indirectly in communication with through one or more components, which may or may not be shown or described herein.

The controller can contain a processor used to control the operation of the memory and can perform such functions as logical-to-physical address mapping, encryption/decryption functionality, error correction code functionality, and wear leveling. Of course, these are merely examples, and the controller recited in the claims does not have to perform all or any of these functions and may be able to perform other functions not listed here. The memory in the memory card can take any suitable form. For example, the memory can take the form of solid-state NAND flash memory; however, other forms of memory can be used. The memory card also comprises a housing that encloses the controller and the memory and exposes the plurality of electrical contacts, so that when the memory card is inserted into a memory card slot in a host device, the exposed electrical contacts of the memory card mate with corresponding electrical contacts of the host device.

Figure 1:
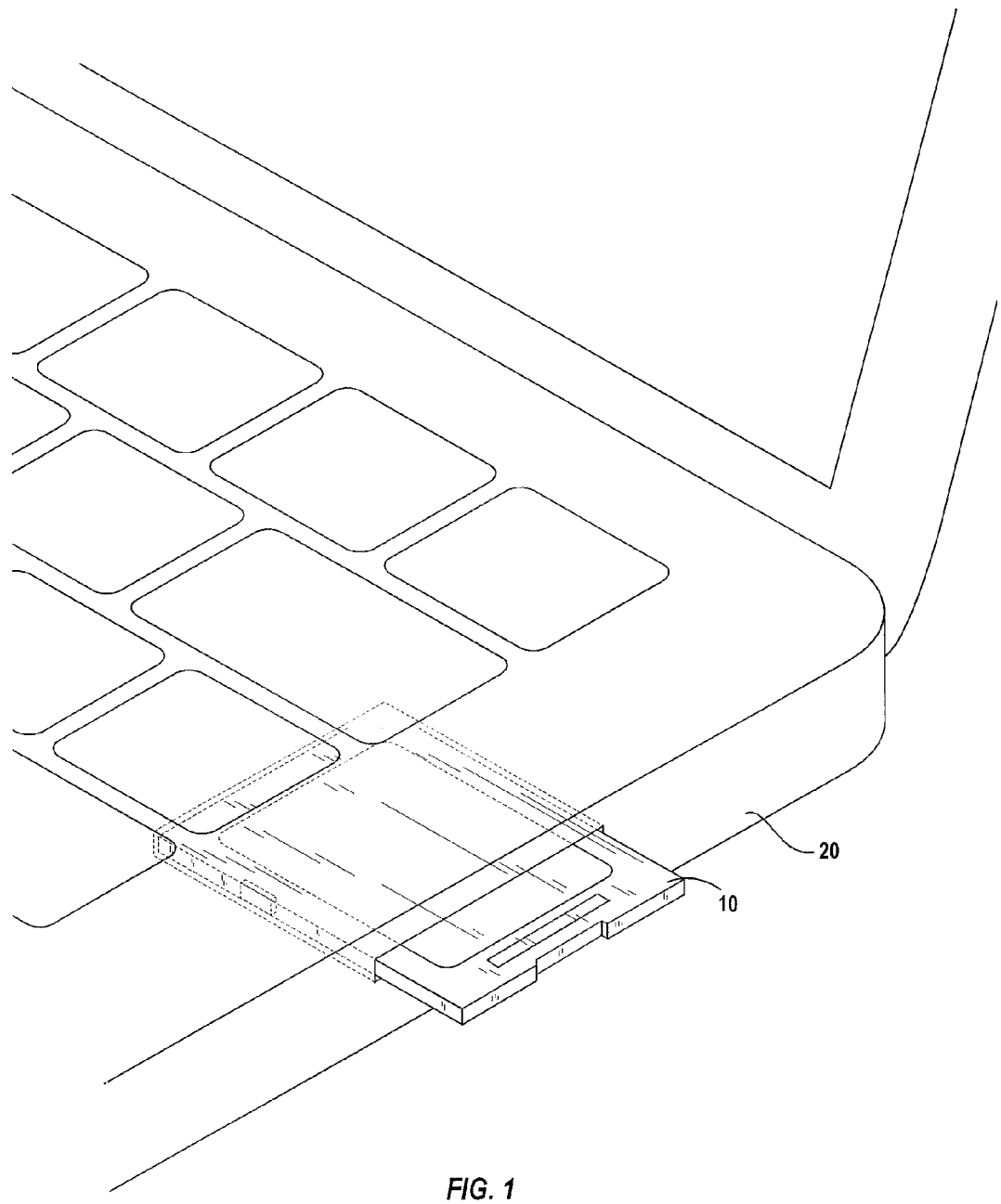
FIG. 1 is an illustration of a prior art SD card inserted into a host device.

As mentioned in the background section above, while some host devices have a spring-loaded locking-and-ejection mechanism that allows the memory card to be almost completely inserted into the host device, other host devices, such as super-compact, ultra-slim form-factor laptop computers (such as a MacBook Air computer and other ultrabook computers), do not have sufficient room for such a mechanism. As a result, the memory slot in such host devices are designed with a shorter depth, so when the memory card is fully inserted into the slot, a significant portion of the memory card 10 is exposed from the laptop computer 20 (see FIG. 1). This allows the user to easily grasp the exposed portion of the memory card with his fingers and pull the memory card out of the slot. In the situation where the memory card 10 is an SD card, about 30% of the SD card 10 (about 9.6 mm) is exposed from the laptop computer 20. While an exposed memory card is suitable in many environments, an exposed memory card may not be aesthetically pleasing in all environments, especially with super-compact, ultra-slim form-factor host devices, where an exposed memory card may detract from the host device's sleek appearance and style and may also prevent the host device from fitting into a form-fitting carrying case.

Further, such host devices may have a greater need for the use of a memory card than other, larger host devices that may have a spring-loaded memory card locking-and-ejection mechanism. For example, while today's super-compact, ultra-slim form-factor host devices typically have a solid-state, NAND flash hard drive, the storage capacity of such drives may be relatively small (e.g., 256 GB) for some users. Upgrading to a larger NAND flash hard drive may not be an option in such host devices, either because such host devices do not have the physical space to accommodate a larger hard drive and/or because the cost of a larger NAND flash hard drive would be very expensive. There may also be heat dissipation issues with a larger hard drive. With no option to upgrade the internal memory of the host device to a higher capacity, a user may wish to use a memory card and leave it plugged into the host device as a semi-permanent storage extension.

The following embodiments present memory cards that can be used with super-compact, ultra-slim form-factor laptop computers (e.g., MacBook Air), as well as other host devices that do not contain a memory slot that is long enough to accept the entire length of currently-available memory cards.

Exemplary Memory Cards

Figures 2, 3A, 3B:
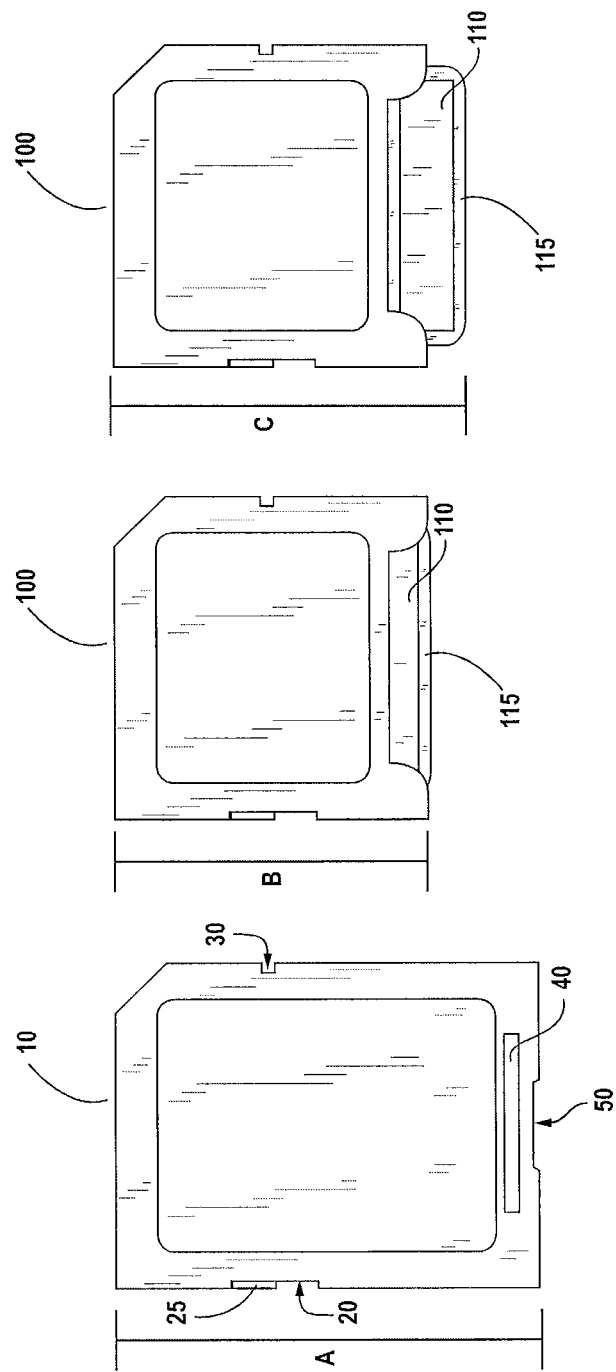
FIG. 2 is an illustration of a prior art SD card.
FIG. 3A is an illustration of a memory card of an embodiment with its extendible gripping portion in a first position.
FIG. 3B is an illustration of a memory card of an embodiment with its extendible gripping portion in a second position.

Returning to the drawings, FIG. 2 illustrates a prior art SD card 10. The SD card 10 has a notch 20 on its left side containing a movable write-protect switch 25, as well as a notch 30 on its right side, which is used to engage a spring-loaded locking-and-ejection mechanism (when used) of a host device. The SD card 10 also has a fingernail notch 40, to allow a user to grip the SD card 10 with his fingernail. Additionally, the SD card 100 has a notch 50 at its lower edge. However, in contrast to some of the designs of the below embodiments, the opening of this notch along the lower edge is the widest portion of the notch 50, as the notch flares inward from the opening. The dimensions of the SD card 10 are defined by the SD Card Specification to be 32 mm long (measurement "A" in FIG. 2), 24 mm wide, and 2.1 mm deep. As mentioned above with respect to FIG. 1, with these dimensions, about 30% (9.6 mm) of the SD card sticks out of a host device 20, such as a MacBook Air computer.

FIGS. 3A and 3B illustrate a memory card 100 of an embodiment. As shown in FIG. 3A, the length of the memory card 100 is less than the length of the SD card 10 (e.g., less than about 32 mm). In one embodiment, the length of the memory card 100 (measurement "B" in FIG. 3A) is about 22 mm, which would allow the memory card 100 to be stick out less from a host device 20 than an SD card 10 (e.g., about 1.5 mm compared 9.6 mm) (see FIG. 4). As shown by a comparison of FIGS. 2 and 3A/3B, even though the width of the memory card 100 is about the same as the width of a standard SD card in this embodiment, the difference in lengths provides the memory card 100 with a very different aspect ratio from a standard SD card. Additionally, in this embodiment, the memory card's housing is sized such that the rear of the housing is substantially flush with an outer surface of the host device 20 when the memory card 100 is inserted into a memory card slot of the host device 20. This solves the problem noted above of an exposed SD card 10 detracting from the host device's sleek appearance and style and possibly preventing the host device 20 from fitting into a form-fitting carrying case. This can occur, for example, when the host device 20 has a memory card slot length of about 22.4 mm, which results in 30% of a standard SD card sticking out from the host device 20 when inserted into the slot.

Figure 4:
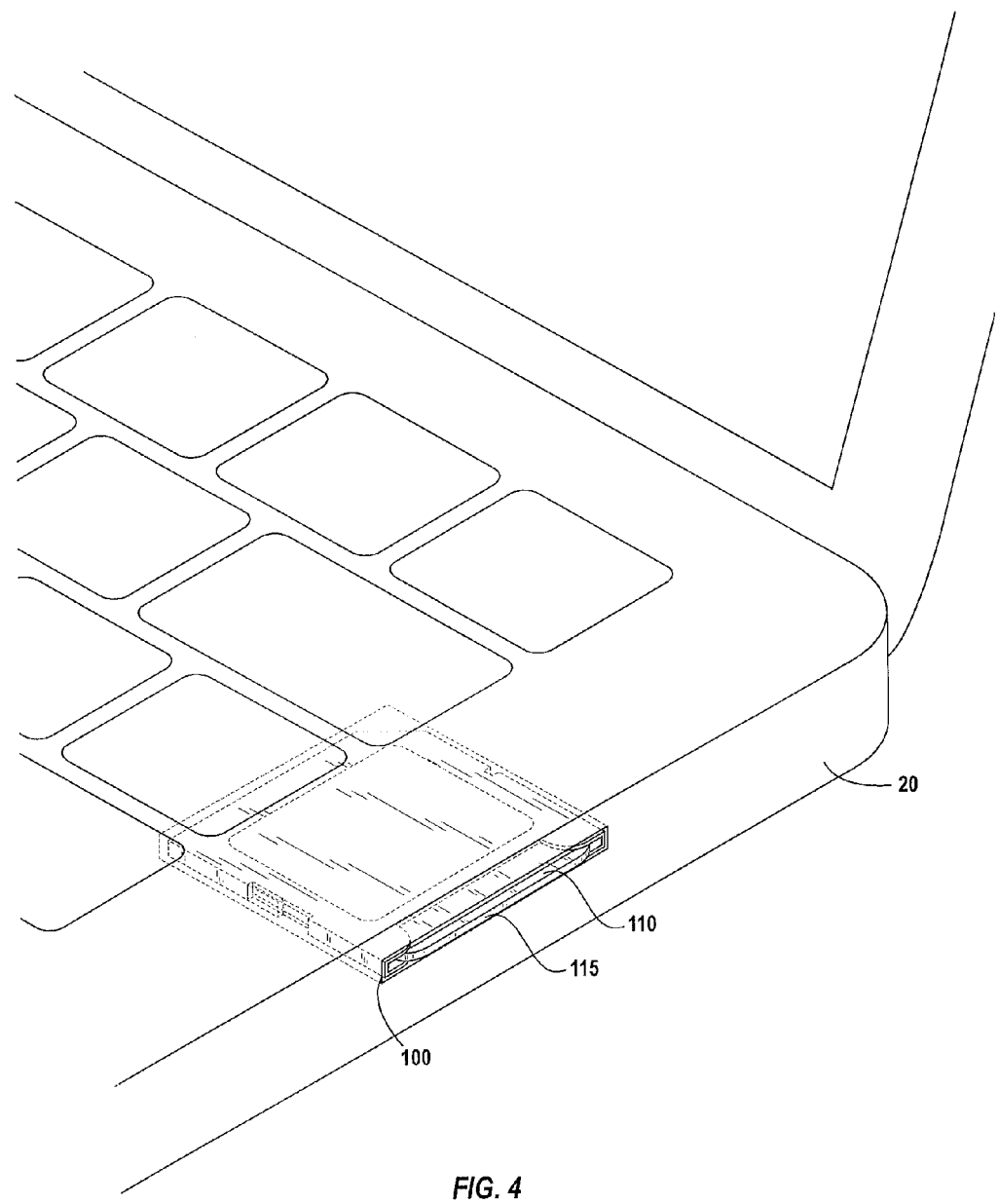
FIG. 4 is an illustration of the memory card of FIG. 3A inserted into a host device, where the memory card's extendible gripping portion is in a first position.

As shown in FIG. 4, because the memory card 100 does not have much, if any, of an exposed area outside of the host device 20 (e.g., when the memory card 100 is sized to be substantially flush with an outer surface the host device 20), it may be difficult for a user to grip the memory card 100 to remove it from the host device 20. Accordingly, in this embodiment, the memory card 100 has an extendible gripping portion 110 movable between a first position (shown in FIG. 3A) and a second position (shown in FIG. 3B), wherein the extendible gripping portion 100 is more exposed from the housing of the memory card 100 in the second position than in the first position. (FIGS. 6-12 are additional views of the memory card 100 with the extendible grip portion 110 in the first position, and FIGS. 13-19 are additional views of the memory card 100 with the extendible grip portion 110 in the second position.)

Figure 5:
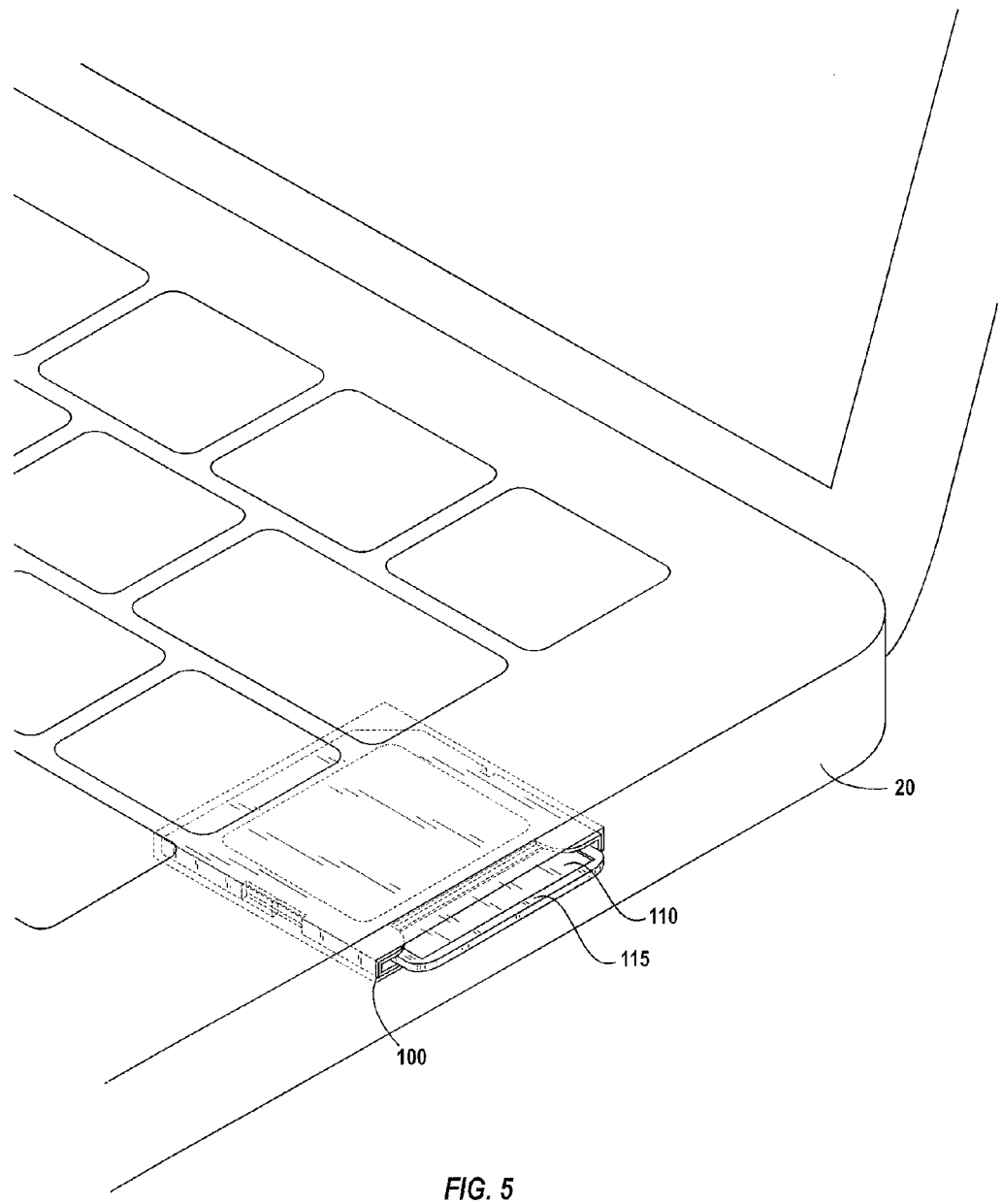
FIG. 5 is an illustration of the memory card of FIG. 3B inserted into a host device, where the memory card's extendible gripping portion is in a second position.
Figure 6:
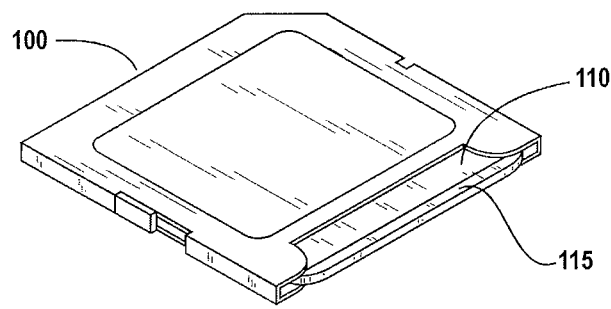
FIG. 6 is a front perspective view of the memory card of FIG. 3A, where the extendible gripping portion is in the first position.
Figure 7:
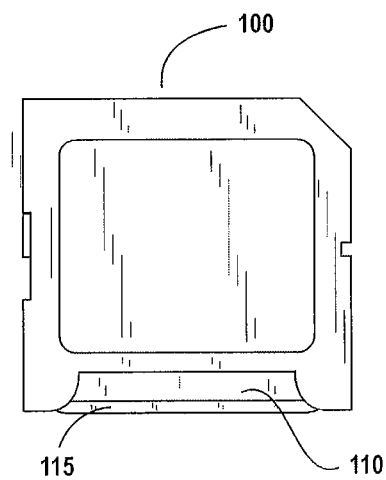
FIG. 7 is a top plan view of the memory card of FIG. 3A.
Figure 8:
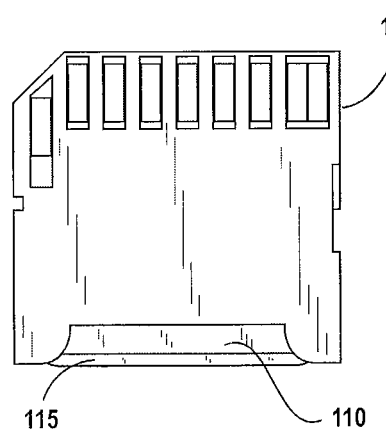
FIG. 8 is a bottom plan view of the memory card of FIG. 3A.
Figure 9:
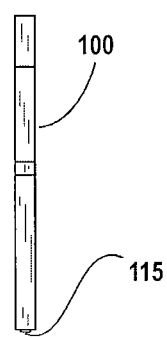
FIG. 9 is a right side elevation view of the memory card of FIG. 3A.
Figure 10:
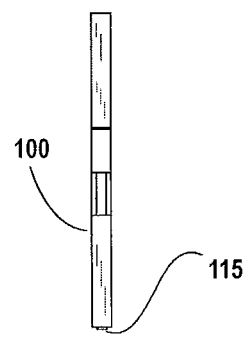
FIG. 10 is a left side elevation view of the memory card of FIG. 3A.
Figure 11:
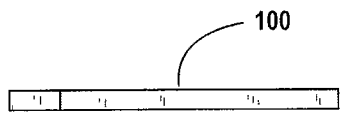
FIG. 11 is a front elevation view of the memory card of FIG. 3A.
Figure 12:
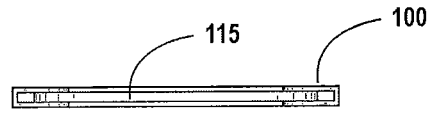
FIG. 12 is a rear elevation view of the memory card of FIG. 3A.
Figure 13:
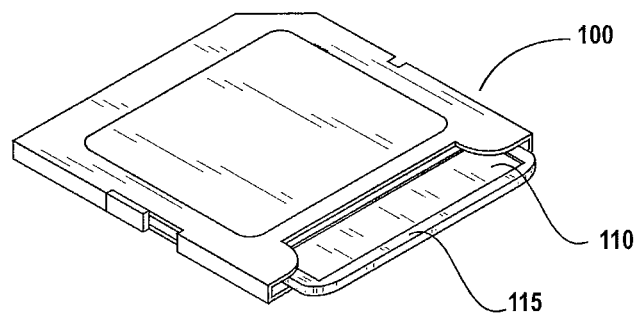
FIG. 13 is a front perspective view of the memory card of FIG. 3B, where the extendible gripping portion is in the second position.
Figure 14:
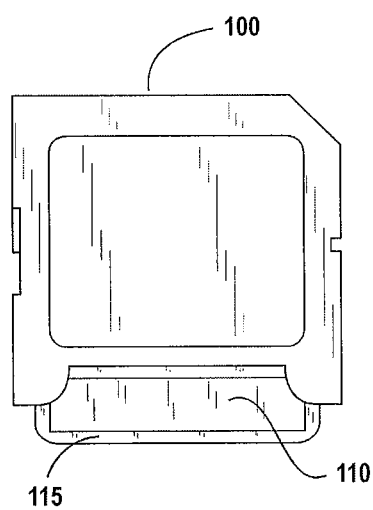
FIG. 14 is a top plan view of the memory card of FIG. 3B.
Figure 15:
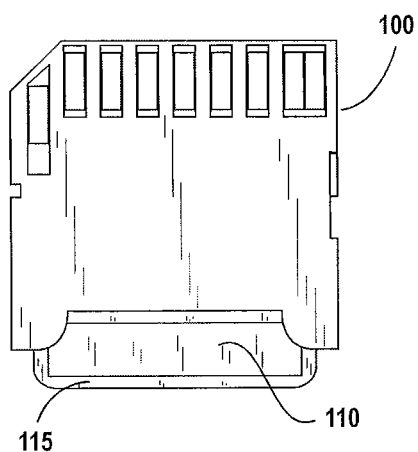
FIG. 15 is a bottom plan view of the memory card of FIG. 3B.
Figure 16:
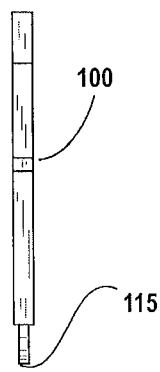
FIG. 16 is a right side elevation view of the memory card of FIG. 3B.
Figure 17:
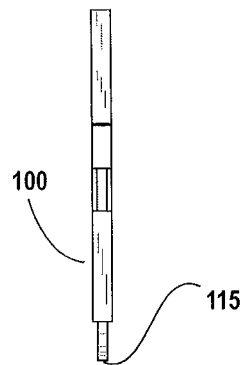
FIG. 17 is a left side elevation view of the memory card of FIG. 3B.
Figure 18:
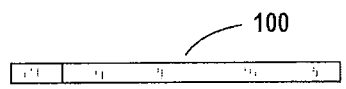
FIG. 18 is a front elevation view of the memory card of FIG. 3B.
Figure 19:
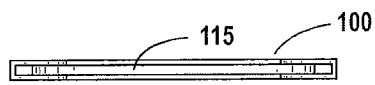
FIG. 19 is a rear elevation view of the memory card of FIG. 3B.
Figure 20:
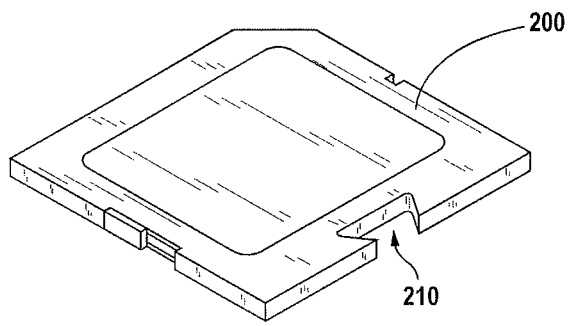
FIG. 20 is a front perspective view of a memory card of another embodiment, where a rear surface of the memory card's housing forms a notch shaped to mate with a mating removal tool.
Figure 21:
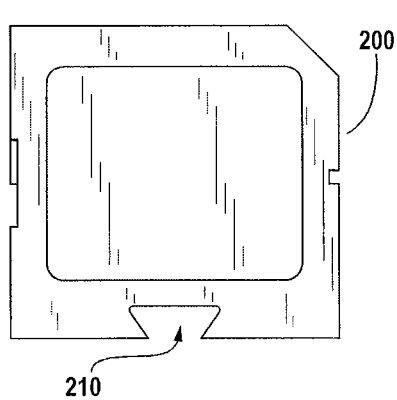
FIG. 21 is a top plan view thereof.
Figure 22:
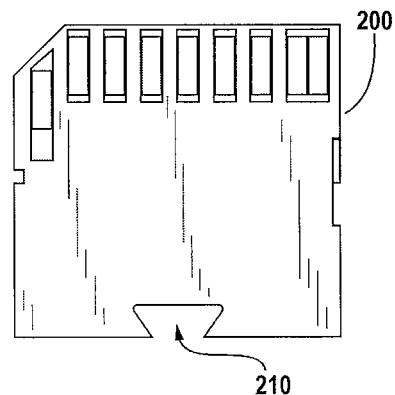
FIG. 22 is a bottom plan view thereof.
Figure 23:
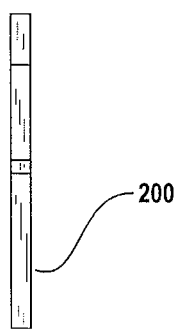
FIG. 23 is a right side elevation view thereof.
Figure 24:
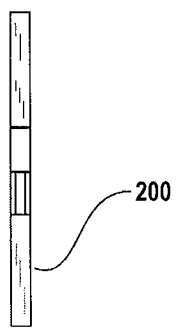
FIG. 24 is a left side elevation view thereof.
Figure 25:
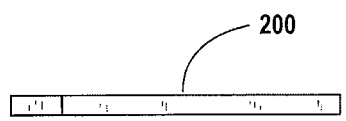
FIG. 25 is a front elevation view thereof.
Figure 26:
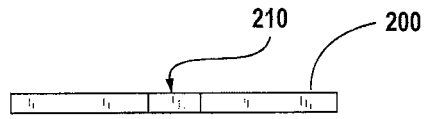
FIG. 26 is a rear elevation view thereof.

The extendible gripping portion 110 in this embodiment comprises a raised edge 115, which allows a user to use his fingernail to pull the extendible gripping portion 110 from the first position to the second position. (Instead of a raised edge, the extendible gripping portion can have a fingernail insert notch or other design.) In this way, when the extendible gripping portion 110 is in the first position, the extendible gripping portion 110 is almost entirely within the housing of the memory card 100. However, when the extendible gripping portion 110 is in the second position, enough of the extendible gripping portion 110 is exposed from the housing, making it easy for the user to pull the memory card 100 from the memory card slot in the host device 20 (see FIG. 5). The length of the memory card 100 when the extendible gripping portion 110 is in the second position is preferably less than the length of an SD card (i.e., less than about 32 mm). In the embodiment shown in FIG. 3B, the length of the memory card 100 when the extendible gripping portion 110 is in the second position is about 25.5 mm (measurement "C" in FIG. 3B).

Other than the changes noted above, the memory card 100 of this embodiment can have similar physical features as an SD card 10 (e.g., left- and right-side notches and a write-protect switch), and the width and the depth of the memory card 100 can be the same as the SD card 10 (i.e., about 24 mm wide and about 2.1 mm deep). The memory card 100 can also function the same way as an SD card 100, and no changes are needed to the circuitry of the SD card 10. This is because SD cards use a system-in-package ("SIP") design that that is skewed towards the electrical contacts side of the card, leaving more than half of the card housing empty. Of course, while the memory card 100 in this embodiment has a form factor similar to an SD card 10 (other than its length), it should be noted that other styles and dimensions of the memory card 100 can be used in other embodiments.

Figure 27:
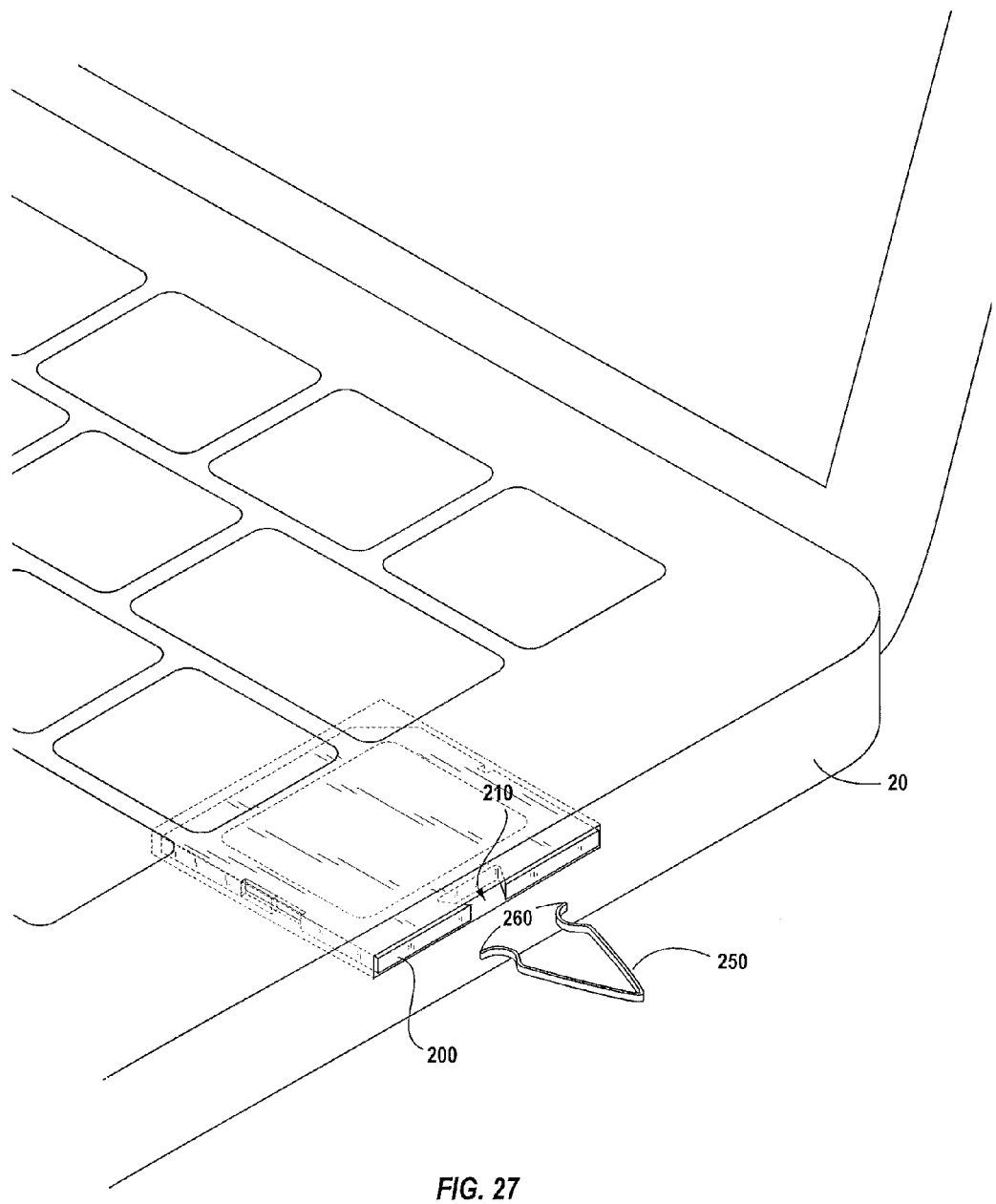
FIG. 27 is an illustration of the memory card of FIGS. 20-26 inserted into a host device and of a mating removal tool, wherein the rear surface of the memory card's housing is substantially flush with the outer housing of the host device.
Figure 28:
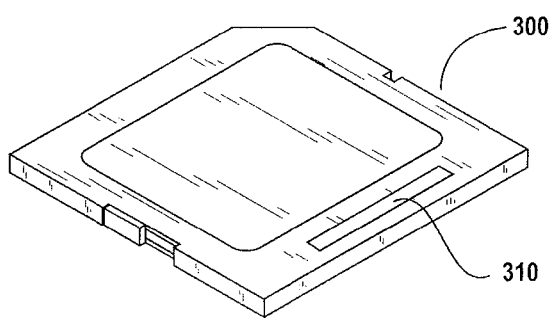
FIG. 28 is a front perspective view of a memory card of another embodiment, where the memory card has a fingernail grip in the form of a groove.
Figure 29:
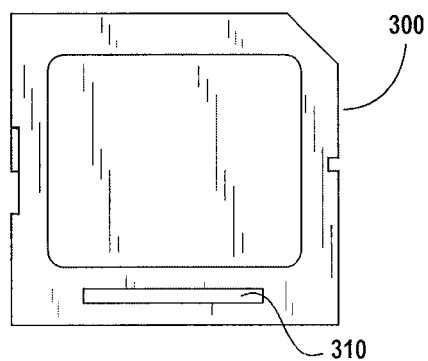
FIG. 29 is a top plan view thereof.
Figure 30:
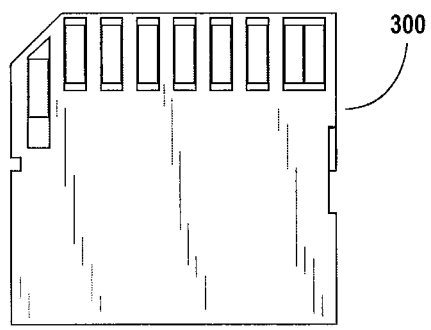
FIG. 30 is a bottom plan view thereof.
Figure 31:
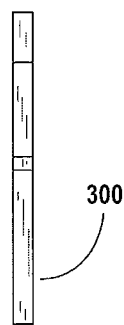
FIG. 31 is a right side elevation view thereof.
Figure 32:
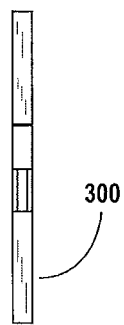
FIG. 32 is a left side elevation view thereof.
Figure 33:
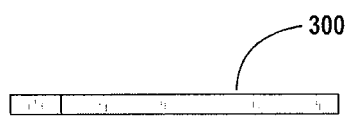
FIG. 33 is a front elevation view thereof.
Figure 34:
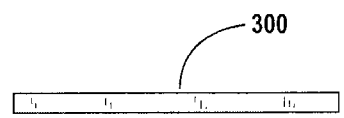
FIG. 34 is a rear elevation view thereof.
Figure 35:
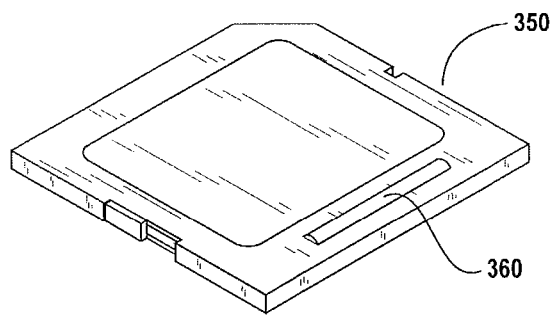
FIG. 35 is a front perspective view of a memory card of another embodiment, where the memory card has a fingernail grip in the form of a protrusion.
Figure 36:
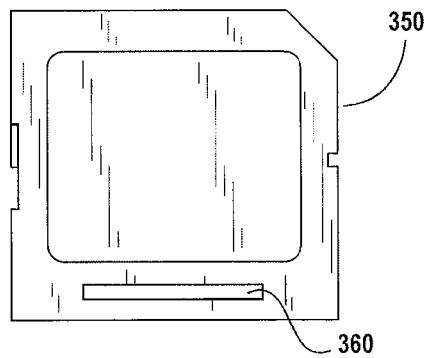
FIG. 36 is a top plan view thereof.
Figure 37:
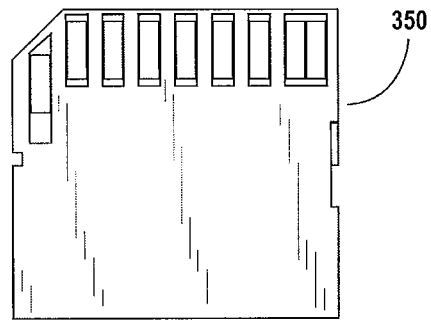
FIG. 37 is a bottom plan view thereof.
Figure 38:
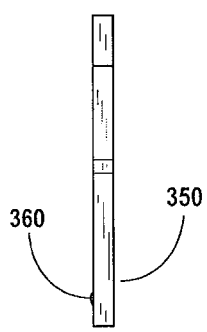
FIG. 38 is a right side elevation view thereof.
Figure 39:
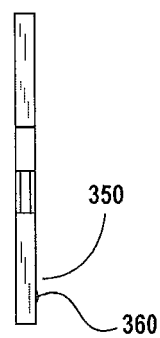
FIG. 39 is a left side elevation view thereof.
Figure 40:
FIG. 40 is a front elevation view thereof.
Figure 41:
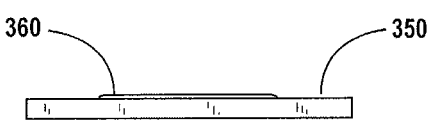
FIG. 41 is a rear elevation view thereof.
Figure 42:
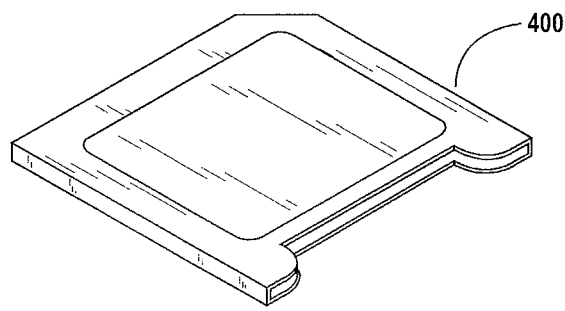
FIG. 42 is a front perspective view of a memory card of another embodiment, where the rear of the memory card is shaped to be used with an extendible grip portion.
Figure 43:
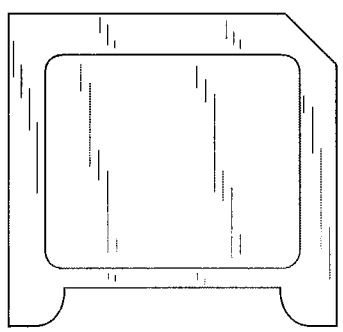
FIG. 43 is a top plan view thereof.
Figure 44:
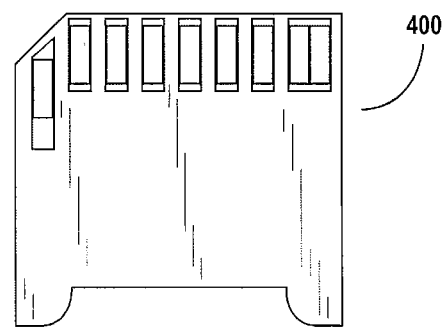
FIG. 44 is a bottom plan view thereof.
Figure 45:
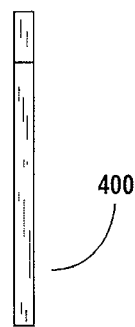
FIG. 45 is a right side elevation view thereof.
Figure 46:
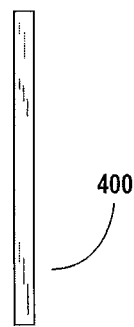
FIG. 46 is a left side elevation view thereof.
Figure 47:
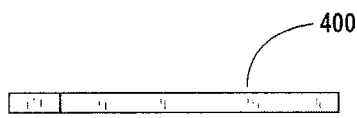
FIG. 47 is a front elevation view thereof.
Figure 48:
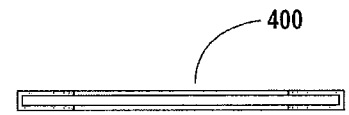
FIG. 48 is a rear elevation view thereof.
Figure 49:
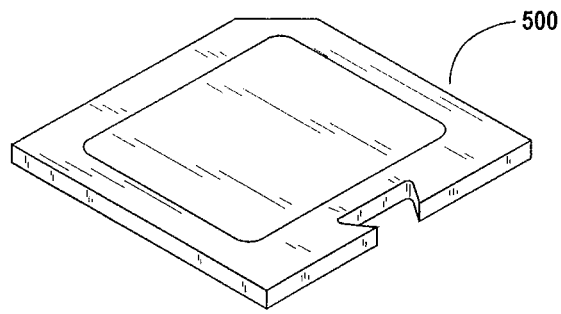
FIG. 49 is a front perspective view of a memory card of another embodiment, where a rear end of the housing of the memory card forms a notch shaped to mate with a mating removal tool.
Figure 50:
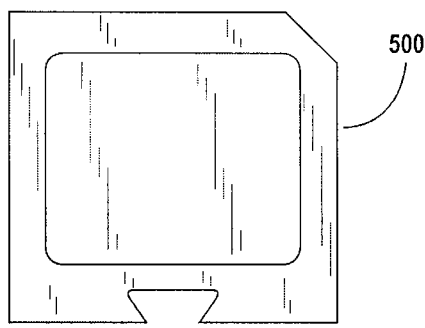
FIG. 50 is a top plan view thereof.
Figure 51:
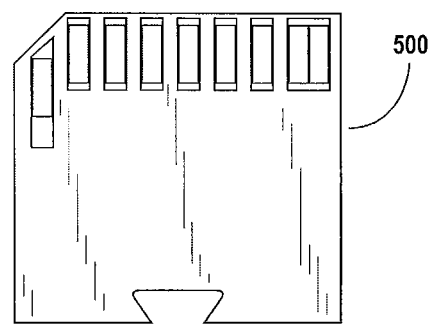
FIG. 51 is a bottom plan view thereof.
Figure 52:
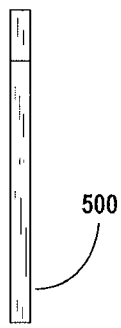
FIG. 52 is a right side elevation view thereof.
Figure 53:
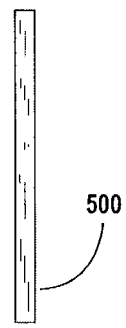
FIG. 53 is a left side elevation view thereof.
Figure 54:
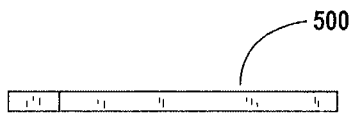
FIG. 54 is a front elevation view thereof.
Figure 55:
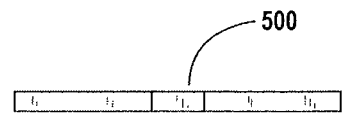
FIG. 55 is a rear elevation view thereof.
Figure 56:
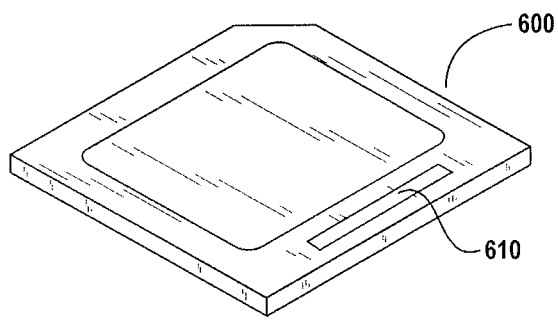
FIG. 56 is a front perspective view of a memory card of another embodiment, where the memory card has a fingernail grip in the form of a groove.
Figure 57:
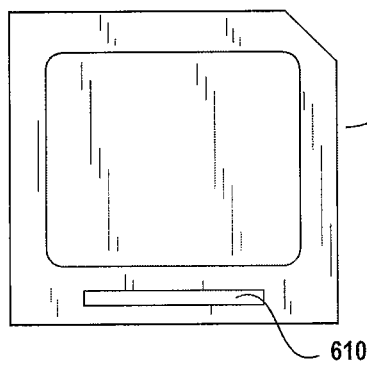
FIG. 57 is a top plan view thereof.
Figure 58:
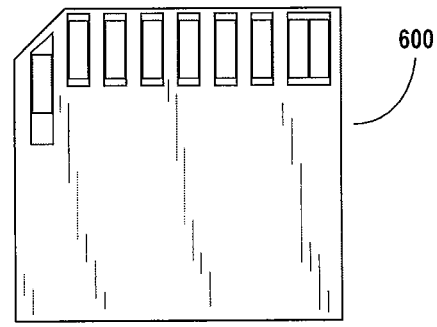
FIG. 58 is a bottom plan view thereof.
Figure 59:
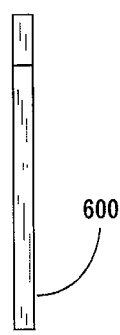
FIG. 59 is a right side elevation view thereof.
Figure 60:
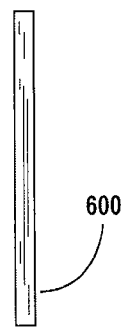
FIG. 60 is a left side elevation view thereof.
Figure 61:
FIG. 61 is a front elevation view thereof
Figure 62:
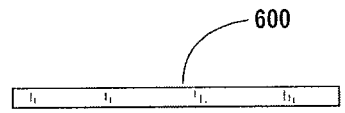
FIG. 62 is a rear elevation view thereof.
Figure 63:
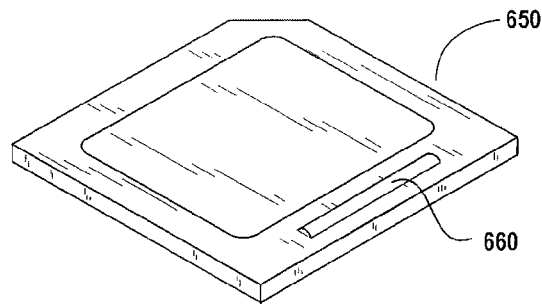
FIG. 63 is a front perspective view of a memory card of another embodiment, where the memory card has a fingernail grip in the form of a protrusion.
Figure 64:
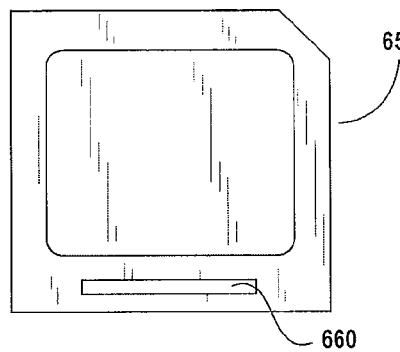
FIG. 64 is a top plan view thereof.
Figure 65:
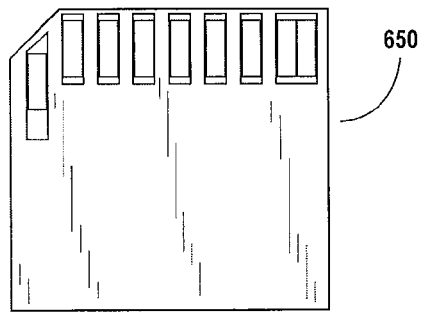
FIG. 65 is a bottom plan view thereof.
Figure 66:
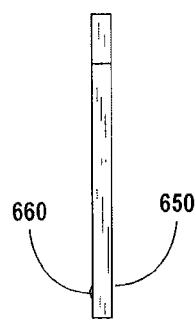
FIG. 66 is a right side elevation view thereof.
Figure 67:
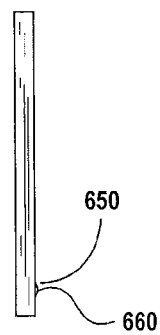
FIG. 67 is a left side elevation view thereof.
Figure 68:
FIG. 68 is a front elevation view thereof.
Figure 69:
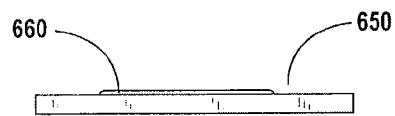
FIG. 69 is a rear elevation view thereof.

Returning to the drawings, FIGS. 20-26 are illustrations of a memory card 200 of another embodiment. This memory card 200 is similar to the memory card 100 discussed above, but instead of having an extendible gripping portion to remove the card from a memory card slot, the end of the housing of this memory card 200 forms a notch 210 shaped to mate with a mating removal tool 250 (see FIG. 27). Such a notch/tool combination would be particularly useful when the memory card's housing is sized such that the rear surface of the memory card's housing is substantially flush with the outer surface of the host device 20 when the memory card 200 is inserted into the host device 20, as, in such a situation, there may not be an easy way for the user to grasp and remove the memory card 200 from the host device 20. In this particular embodiment, the notch 210 is trapezoidal in shape, and the opening of the notch 210 is along the edge of the memory card's housing is the narrowest portion of the notch 210, as the notch 210 flares out from there. (This is in contrast to the notch 50 in the SD card 10, whose opening is the widest portion of the notch 50, as the notch flares inward from the opening.) This allows protruding hooks 260 of the removal tool 250 to grasp the interior corners of the notch 210. Accordingly, in this embodiment, a user would push the memory card 200 into the memory card slot on the host device 20 and then use the removal tool 250 to grasp the interior corners of the notch 210 and pull the memory card 200 from the host device 20. This avoids the need to manufacture a separate, movable part, as used in the memory card 100 of the other embodiment described above. Also, because an external removal tool 250 is used to remove the memory card 200 from the slot, the memory card 200 can be sized to fit flush with the host device, as the user does not need an exposed fingernail grip or raised edge to grasp the memory card 200.

In yet another embodiment shown in FIGS. 28-34, the memory card 300 is similar to the memory card 200 shown in FIGS. 20-26 but without a notch at the rear end of the housing. Instead, the memory card 300 has a fingernail grip 310, which, in this embodiment, takes the form of a groove or a depression. The length of this memory card 300 is preferably less than about 32 mm (the length of a standard SD card), has a width of about 24 mm (the width of a standard SD card), and has a depth of about 2.1 mm (the depth of a standard SD card). In one embodiment, the length of the memory card 300 is about 22 mm, which would allow the memory card 300 to fit almost flush with several host devices. This memory card 300 may be well suited for host devices that have a spring-loaded locking-and-ejection mechanism, as unlike the memory cards 100, 200 described above, this memory card 300 does not have its own extraction/removal mechanism. However, as noted below, a host device can be designed with a depression near the memory card slot to allow fingernail access to a fingernail grip of an inserted memory card.

In the embodiment shown in FIG. 28-34, the fingernail grip 310 took the form of a groove (i.e., a recess or other negative geometry). In another embodiment, shown in FIGS. 35-41, the fingernail grip 360 takes the form of a protrusion (a bump or other positive geometry) on the memory card 350.

It is important to note that the designs and dimensions described above are merely examples, and many alternatives can be used. For example, whereas the memory cards 100, 200, 300, 350 discussed above have notches on their left and right sides, other designs can be used without such notches. FIGS. 42-48, 49-55, 56-62, and 63-69 show memory cards 400, 500, 600, 650 that correspond with memory cards 100, 200, 300, 350 but without those notches. (FIGS. 56-62 also show the bounding shape of the two memory cards 100, 200 discussed above, in that the two memory cards 100, 200 discussed above are tightly bound by the convex polygon shown in FIGS. 56-62.) Also, memory card 400 in FIGS. 42-48 shows the housing of the memory card 400 without the extendible gripping portion to illustrate that any suitable shaped or sized extendible gripping portion can be used, and not merely the particular design shown in FIGS. 3A and 3B. Additionally, while the extendible gripping portion 110 in memory card 100 was shown as sticking slightly out of the host device in FIG. 4 to allow a user to grab the raised edge 115 of the extendible gripping portion 110 with his fingernail, in an alternative embodiment, the rear edge of the extendible gripping portion has a small folding portion that can fold slightly below the slot (e.g., perpendicular to the plane of the card) without disturbing the design of the host device. To remove the memory card, the user would flip the small folding section to be in the same plane as the card and then pull out the extendible gripping portion. With respect to the memory card 200 and 500 shown in FIGS. 20-26 and 49-55, while the notch shown in memory card was trapezoidal in shape, it should be understood that any other suitable shape can be used for the notch. Additionally, while the above exemplary memory cards were based on an SD card design (but shorter), the memory cards of these embodiments can take other forms. For example, a memory card can be based on the design of a microSD adapter or of a miniSD card, which has a length of about 21.5 mm, a width of about 20 mm, and a depth of 1.4 mm.

Figure 70:
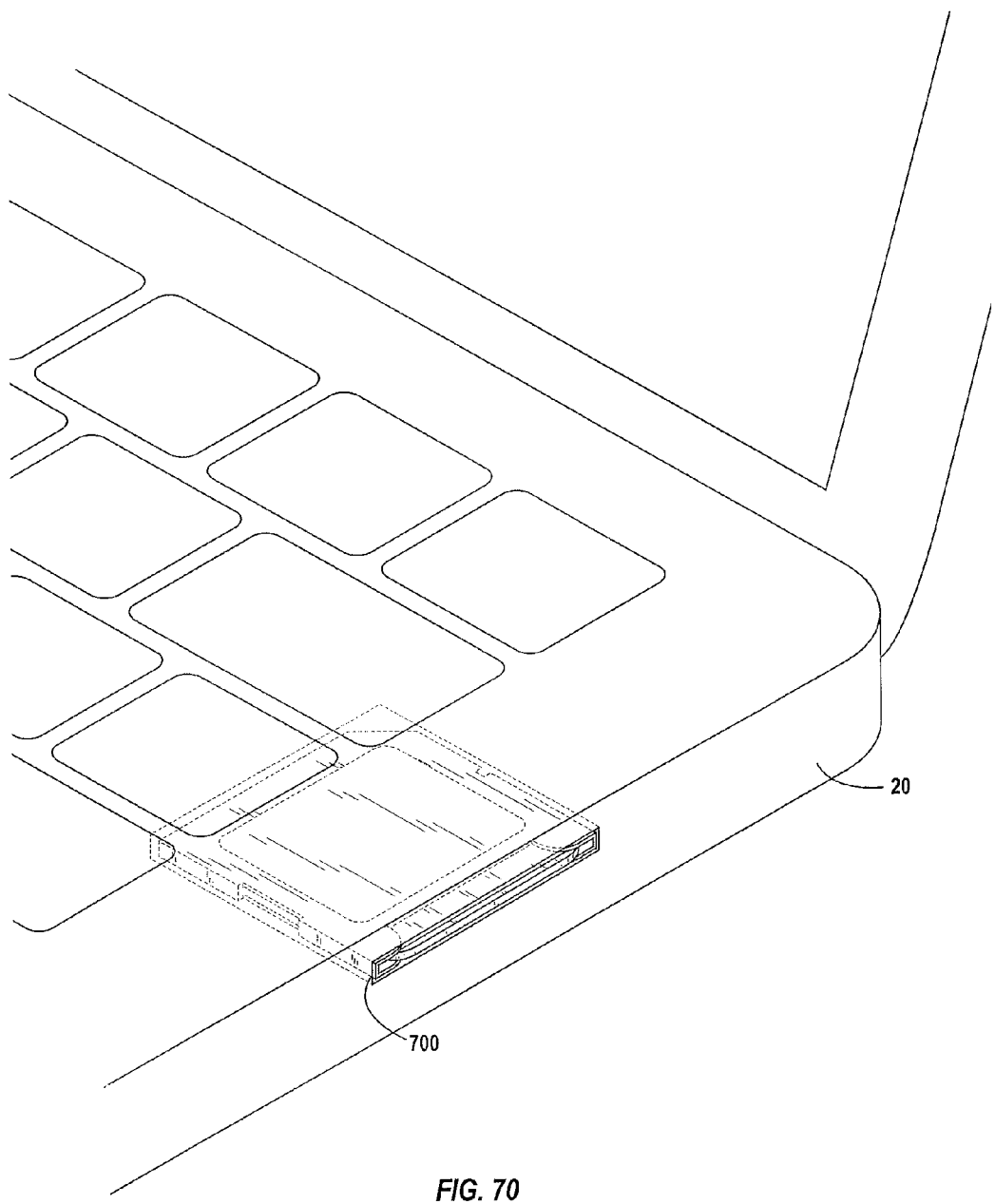
FIG. 70 is an illustration of a memory card of an embodiment, where the rear surface of the memory card's housing is substantially flush with the outer housing of the host device, and where the extendible gripping portion of the memory card is substantially flush with the rear surface of the memory card's housing when in the first position.

FIG. 70 presents another alternative embodiment. As mentioned above and as shown in FIG. 4, the extendible gripping portion 110 in memory card 100 protruded slightly from an outer surface of the host device 20 in the first position to allow a user to grip the raised edge 115 with his fingernail to pull out the extendible gripping portion 120 to the second position. In the embodiment shown in FIG. 70, the memory card 700 is substantially flush with the host device 20, and the memory card 700 contains an internal spring mechanism that is configured to push the extendible gripping portion outwards into the second position when the extendible gripping portion is pressed inward. By being substantially flush with the host device 20, the memory card 700 can serve as a "plug and forget" memory device because, by being substantially flush with the host device 20, the user may not even see the memory card 700 plugged into the host device 20.

It should also be noted that while the above embodiments discussed the shape of the memory card, other features of the memory card can be customized to host devices that would accommodate these memory cards. For example, if the memory cards were to be used in MacBook Air computers, the memory cards can be designed with a Mac look-and-feel, can be formatted with the Mac file system, and can have a relatively high-performance controller to match the performance of the MacBook's controller.

Exemplary Host Device

Figure 71:
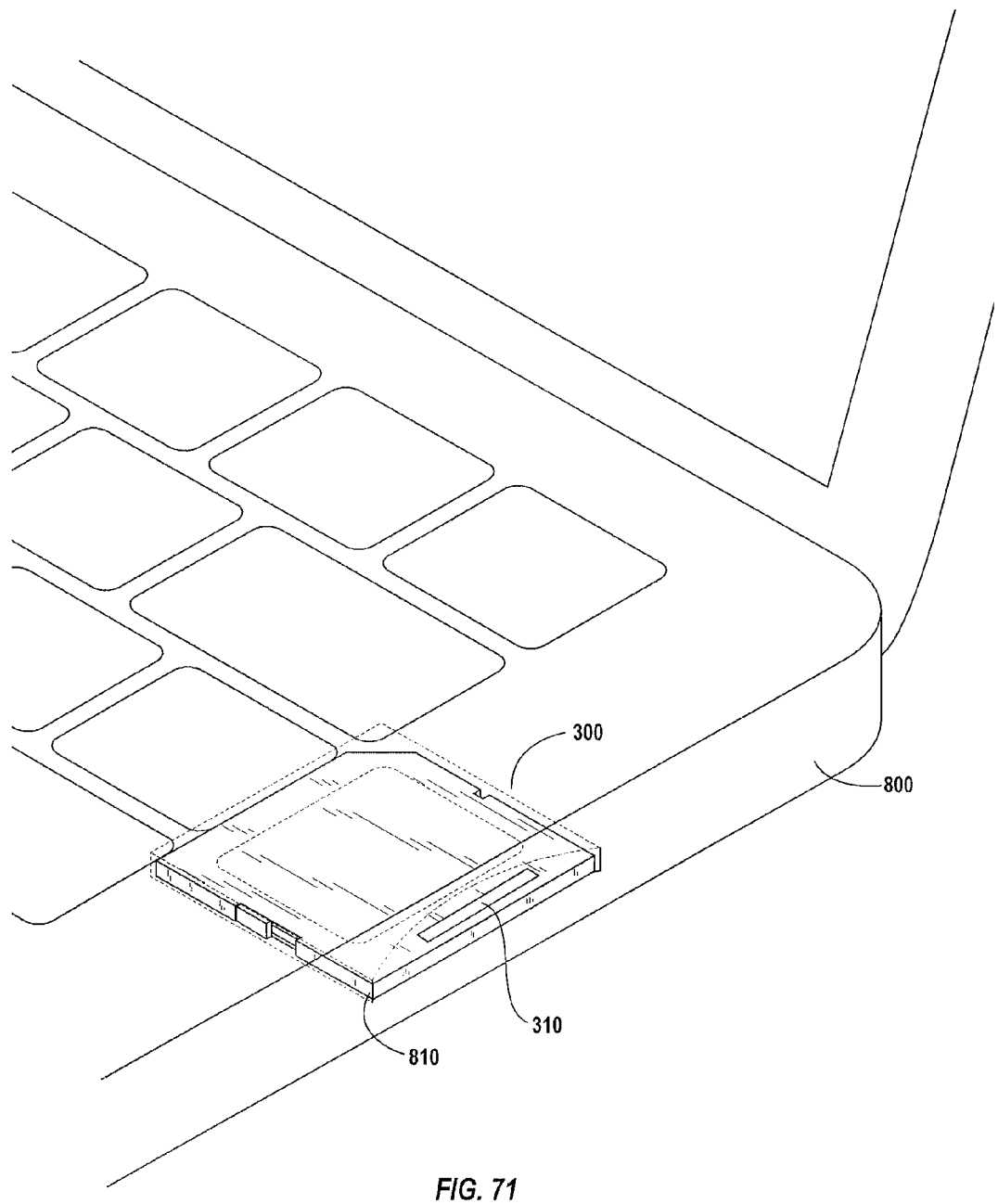
FIGS. 71 and 72 are illustrations of a host device having a recess in its outer surface near the memory card slot allowing a fingernail to access a fingernail grip portion of a memory card when the memory card is substantially flush with the outer surface of the host device.
Figure 72:
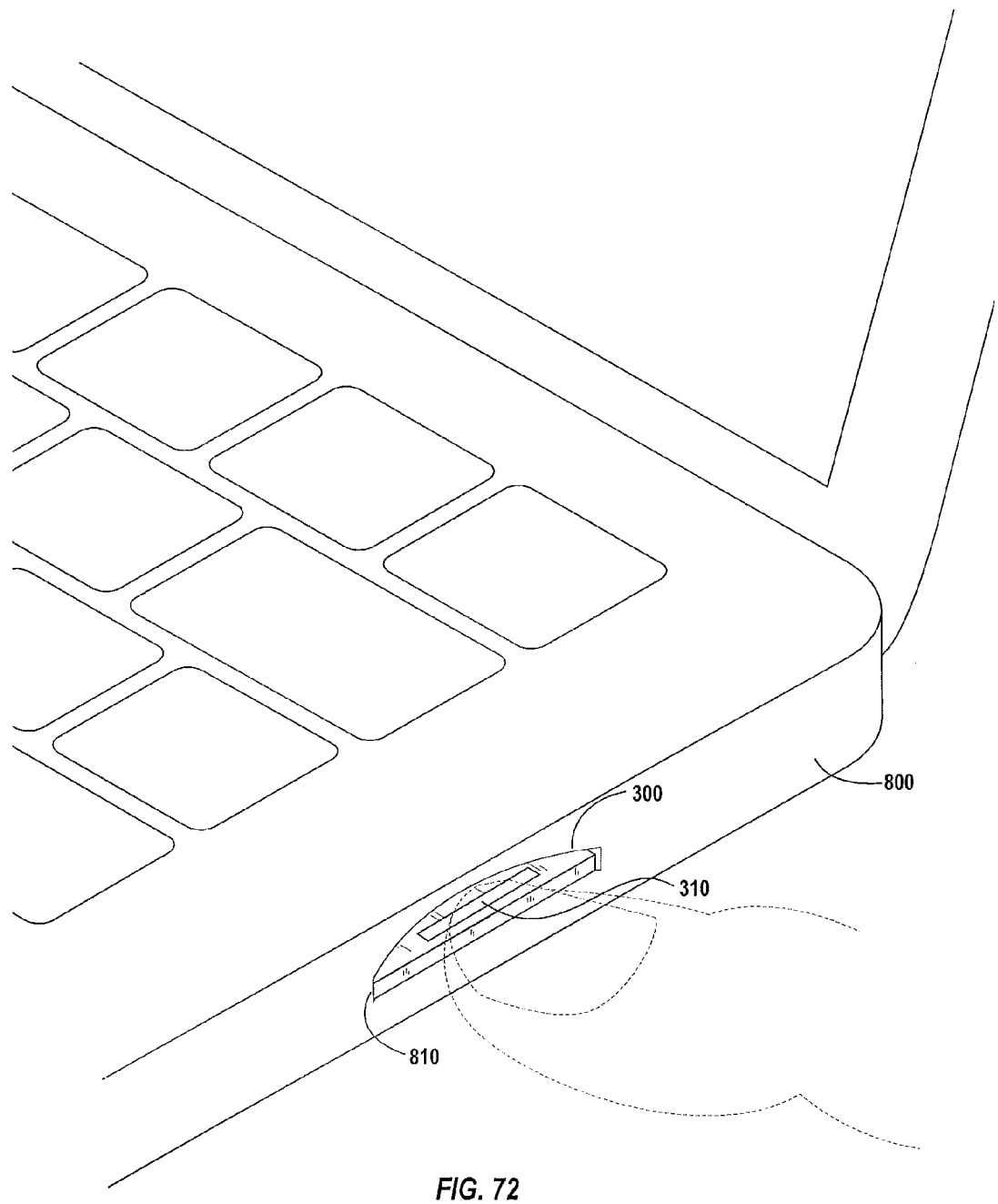
Figure 73:
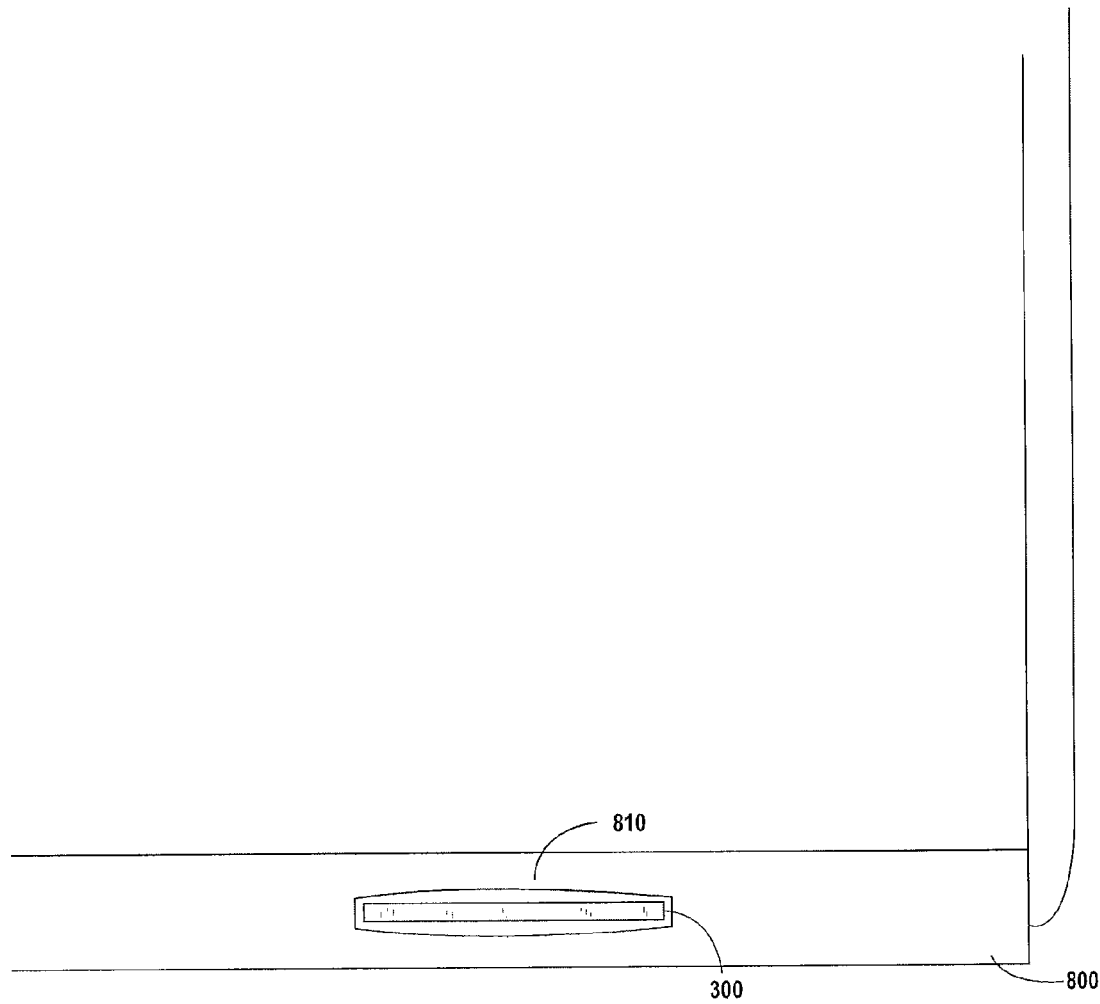
FIG. 73 is a side view of the host device of FIGS. 71 and 72.

As noted above, when a memory card's housing is sized to be substantially flush with an outer surface of a host device when the memory card is inserted into the host device, it may be difficult for a user to remove the memory card from the host device if the memory card does not have its own extraction mechanism (e.g., an extendible gripping portion or a notch for use with a mating extraction tool). This may be the situation, for example, with the memory card 300 of FIG. 28 and when the host device's memory card slot's length is about 22.4 mm. To address this possible difficulty, the outer surface of the host device 800 can be configured with a recess or depression 810 near the memory card slot to allow fingernail access to the fingernail grip 310 of the memory card 300 (see FIGS. 71, 72, and 73). It should be noted that the recess can take any desired shape and does not have to be rounded or have the same shape as shown in FIGS. 71, 72, and 73.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host device comprising:
    a housing with an outer surface;
    a memory card slot formed in the housing and having an opening in the outer surface configured to receive a memory card for insertion into the memory card slot;
    a plurality of electrical contacts exposed in the memory card slot for engaging corresponding contacts on a memory card when the memory card is inside the memory card slot;
    a recess at the opening of the memory card slot, wherein the recess is sized to allow gripping and extraction access to a the memory card inside the memory card slot, and wherein a bottom surface of a part of the housing that forms the recess is above a portion of a top surface of the memory card when the memory card is inside the memory card slot; and
    a processor configured to store data in or retrieve data from the memory card when the contacts on the memory card are engaged with the contacts in the memory card slot.

2. The host device of claim 1, wherein the memory card slot has a length sized to allow a rear surface of a housing of the memory card to be substantially flush with the outer surface of the housing.

3. The host device of claim 1, wherein a length of the memory card slot is about 22.4 mm.

4. The host device of claim 1, wherein the recess is perpendicular to a direction of insertion into the memory card slot.

5. The host device of claim 1, wherein the recess is in a plane above a direction of insertion into the memory card slot.

6. The host device of claim 1, wherein the recess is invisible when looking at a top surface of the housing.

* * * * *

UNITED STATES PATENT AND TRADEMARK OFFICE
CERTIFICATE OF CORRECTION

| | | |
|---|---|---|
| PATENT NO. | : 8,747,162 B2 | Page 1 of 1 |
| APPLICATION NO. | : 13/434455 | |
| DATED | : June 10, 2014 | |
| INVENTOR(S) | : Leah Sherry | |

It is certified that error appears in the above-identified patent and that said Letters Patent is hereby corrected as shown below:

In the Claims

Column 8, claim 1, line 60, before "the memory card inside" delete "a".

Signed and Sealed this
Eleventh Day of November, 2014

Michelle K. Lee
*Deputy Director of the United States Patent and Trademark Office*